(12) United States Patent
Kim et al.

(10) Patent No.: US 10,018,325 B2
(45) Date of Patent: Jul. 10, 2018

(54) LIGHT DEVICE OF VEHICLE

(71) Applicant: SEOUL SEMICONDUCTOR CO., LTD., Ansan-si (KR)

(72) Inventors: Tae Kwang Kim, Ansan-si (KR); Young Jun Song, Ansan-si (KR); Lae Hyun Kim, Ansan-si (KR); Yeoun Chul Shon, Ansan-si (KR)

(73) Assignee: Seoul Semiconductor Co., Ltd., Ansan-si (KR)

( * ) Notice: Subject to any disclaimer, the term of this patent is extended or adjusted under 35 U.S.C. 154(b) by 150 days.

(21) Appl. No.: 14/841,641

(22) Filed: Aug. 31, 2015

(65) Prior Publication Data
US 2016/0290588 A1 Oct. 6, 2016

(30) Foreign Application Priority Data

Mar. 31, 2015 (KR) .................. 10-2015-0045278
Aug. 28, 2015 (KR) .................. 10-2015-0121988

(51) Int. Cl.
*F21V 9/00* (2018.01)
*F21S 8/10* (2006.01)
(Continued)

(52) U.S. Cl.
CPC ........ *F21S 48/2243* (2013.01); *B60Q 1/0058* (2013.01); *B60Q 1/2607* (2013.01);
(Continued)

(58) Field of Classification Search
CPC ............... F21S 48/1241; F21S 48/2225; F21S 48/2231; F21S 48/2243; F21S 48/225; F21S 48/2256
See application file for complete search history.

(56) References Cited

U.S. PATENT DOCUMENTS

2004/0208019 A1* 10/2004 Koizumi ............. B60Q 1/0041
362/545
2008/0002400 A1 1/2008 Huang
2016/0195234 A1* 7/2016 Mateju ................ A61N 1/0468
362/511

FOREIGN PATENT DOCUMENTS

DE  10 2010 054923 A1   6/2012
DE  10 2013 212353 A1  12/2014
(Continued)

OTHER PUBLICATIONS

Japanese Patent Office, Japanese Patent Application No. 2015-200010, Office Action, dated Jul. 5, 2016, 8 pages.
(Continued)

*Primary Examiner* — Ali Alavi
(74) *Attorney, Agent, or Firm* — Perkins Coie LLP

(57) ABSTRACT

Disclosed herein is a light device of a vehicle including: a light emitting diode module emitting light; and a light guide plate having a side on which the light emitted from the light emitting diode module is incident and emitting the light incident on the side to perform surface emission upwardly, in which the light guide plate has a plane shape including at least one concave portion and the light emitting diode module is installed in the at least one concave portion. According to the exemplary embodiments of the present invention, when the light guide plate used in the light device installed at the rear of the vehicle to perform the surface emission is formed in a horseshoe shape or a ring shape, the light emitting diode module may be installed at a concave position of the horseshoe shape or the light emitting diode module may be installed along a ring-shaped inner side, thereby uniformly performing the surface emission over the whole of the light guide plate.

26 Claims, 8 Drawing Sheets

(51) Int. Cl.
  *B60Q 1/00* (2006.01)
  *B60Q 1/26* (2006.01)
  *F21V 8/00* (2006.01)
  *F21S 43/14* (2018.01)
  *F21S 43/239* (2018.01)
  *F21S 43/241* (2018.01)
  *F21S 43/245* (2018.01)
  *F21S 43/249* (2018.01)
  *F21S 43/247* (2018.01)

(52) U.S. Cl.
  CPC ............ *F21S 43/14* (2018.01); *F21S 43/239* (2018.01); *F21S 43/241* (2018.01); *F21S 43/245* (2018.01); *F21S 43/247* (2018.01); *F21S 43/249* (2018.01); *G02B 6/0011* (2013.01)

(56) References Cited

FOREIGN PATENT DOCUMENTS

| | | |
|---|---|---|
| EP | 2 708 800 A2 | 3/2014 |
| JP | 07-036319 A | 2/1995 |
| JP | 1995-036319 | 7/1995 |
| JP | 2007-294230 | 11/2007 |
| JP | 2010-108795 | 5/2010 |
| JP | 2001-222905 | 8/2011 |
| JP | 2011-198537 | 10/2011 |
| JP | 2012-089467 | 2/2012 |
| JP | 2012-094514 | 5/2012 |
| JP | 2012-156056 | 8/2012 |
| JP | 2013-062110 | 4/2013 |
| JP | 2014-067630 | 4/2014 |
| JP | 2014149995 * | 8/2014 ............... F21S 8/10 |
| JP | 2014-212079 | 11/2014 |

OTHER PUBLICATIONS

Extended European Search Report in European Patent Application No. 15183178.1, dated Jan. 4, 2017.

Office Action in Chinese Patent Application No. 201510779472.6, dated Feb. 11, 2018.

* cited by examiner

[Figure 1]
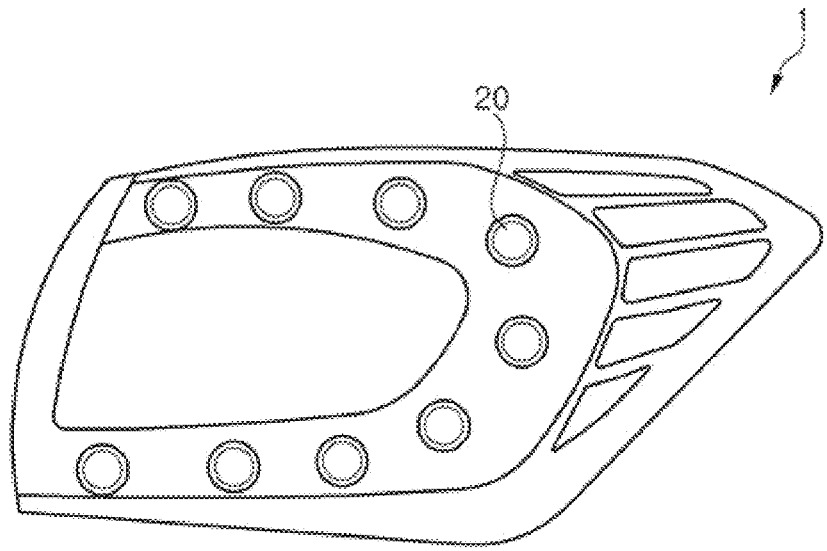
[Figure 2]
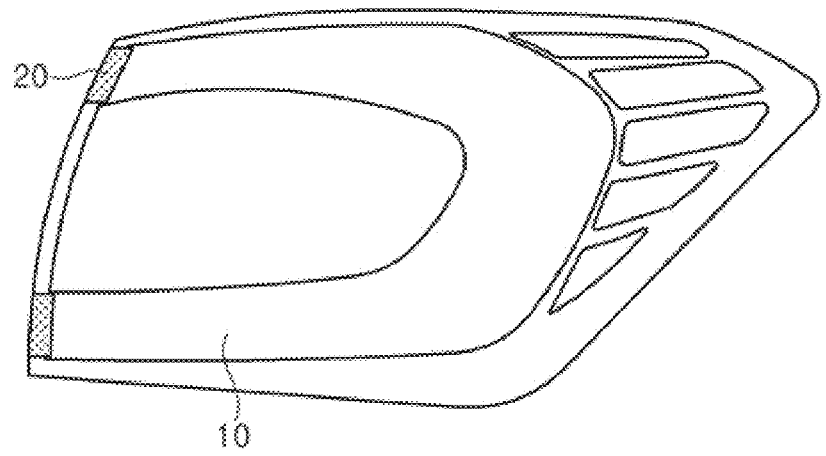

[Figure 3]
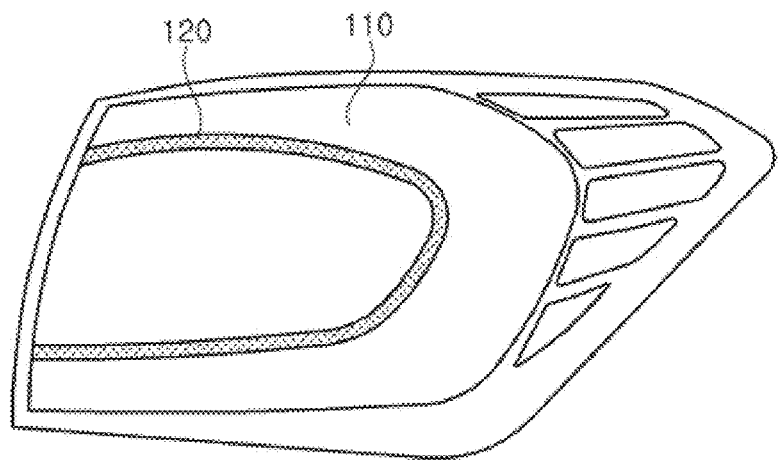
[Figure 4]
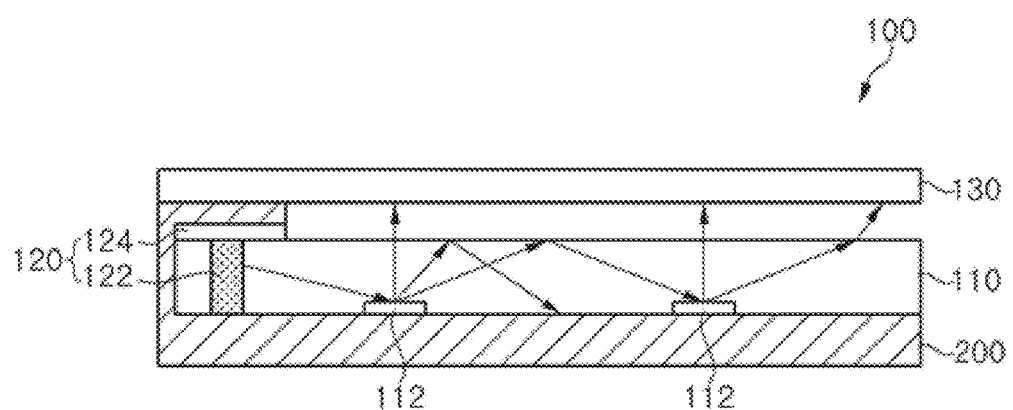
[Figure 5]
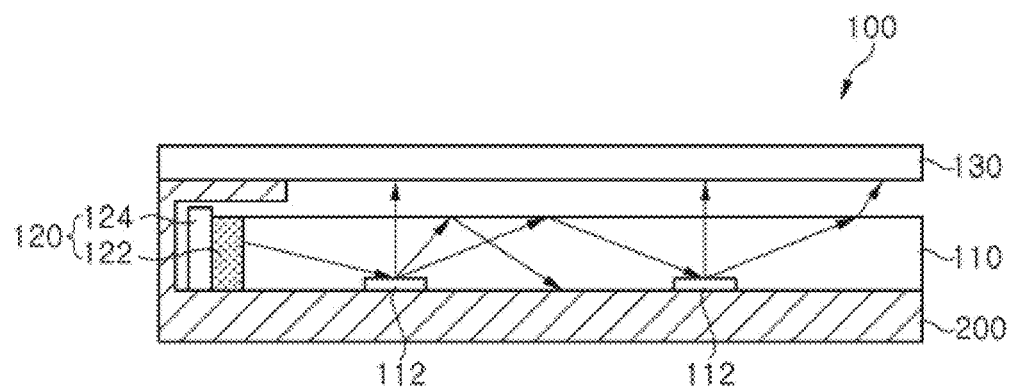

[Figure 6]
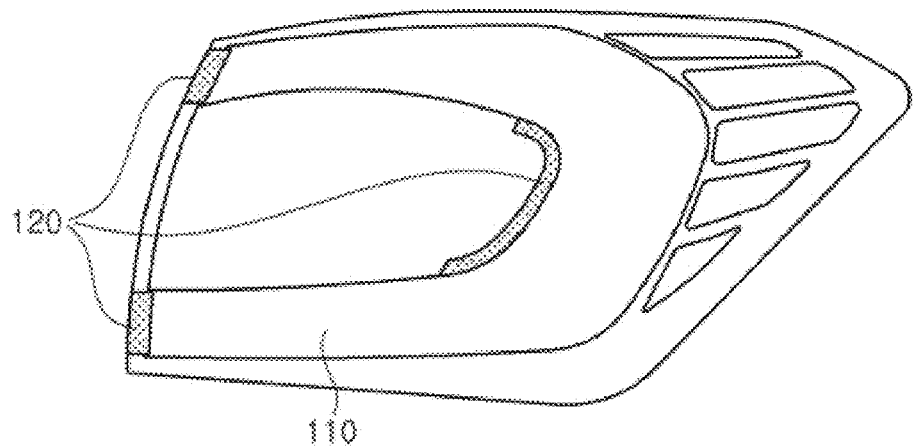
[Figure 7]
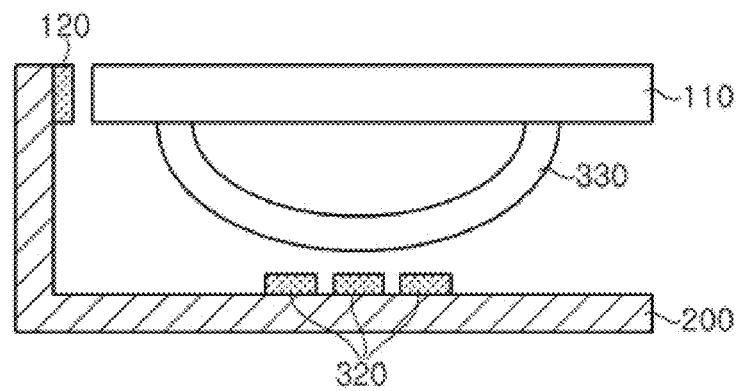
[Figure 8]
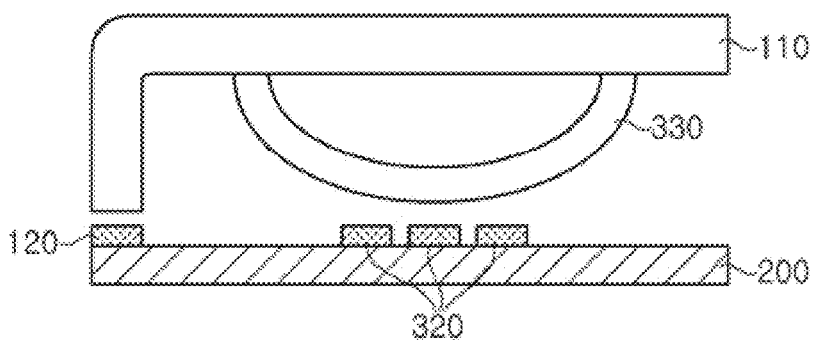

[Figure 9]
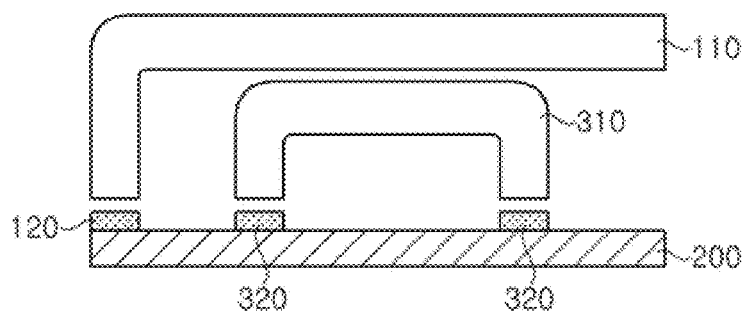
[Figure 10]
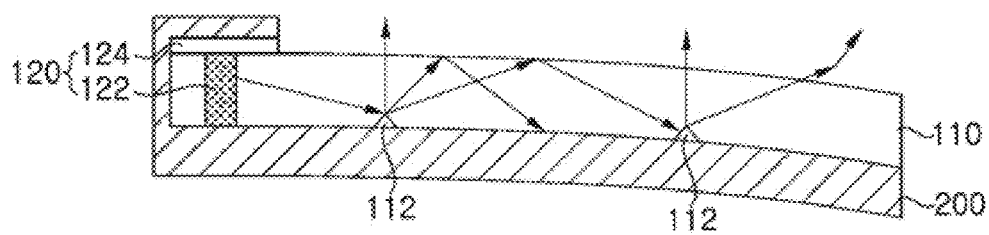
[Figure 11]
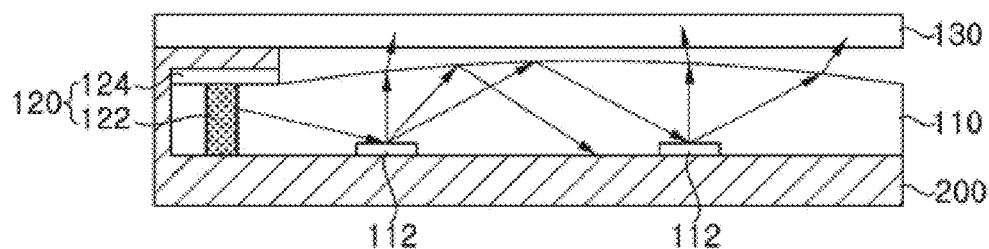

[Figure 12]
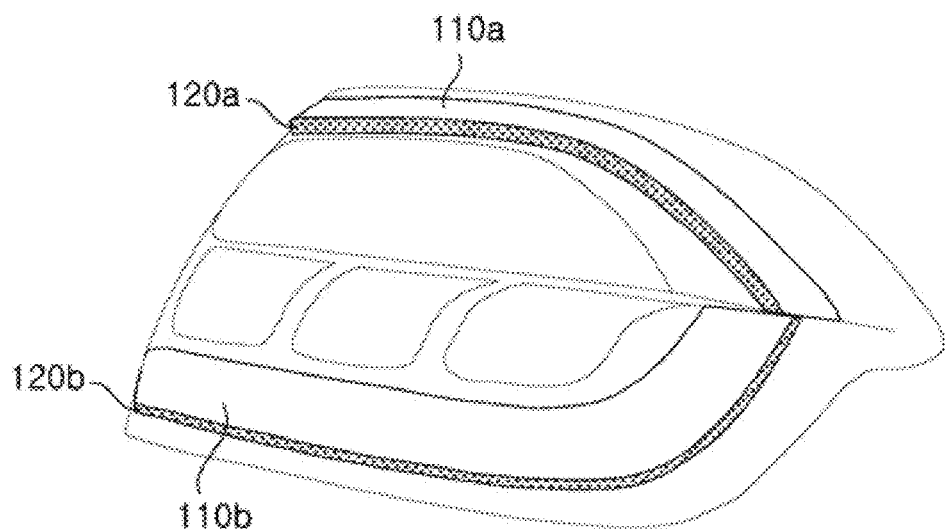
[Figure 13(a)]
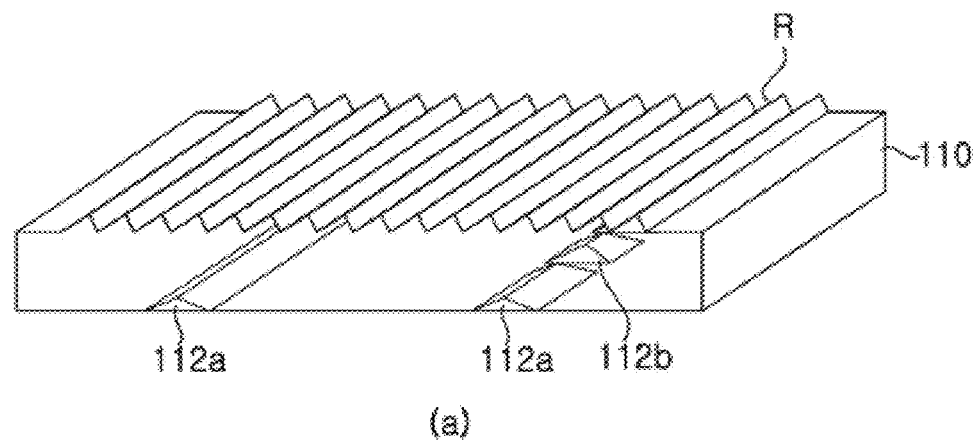
(a)
[Figure 13(b)]
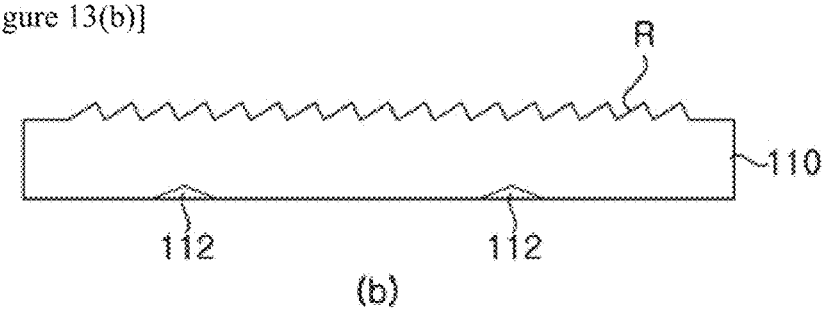
(b)

[Figure 14]
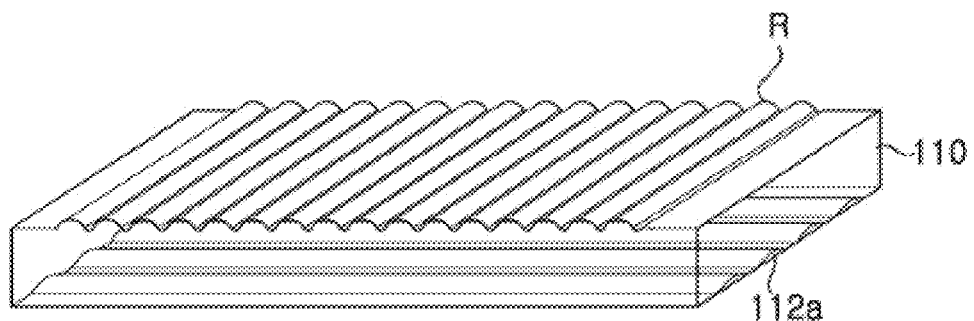

[Figure 15(a)]
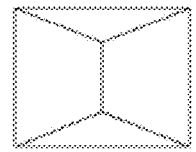
[Figure 15(b)]
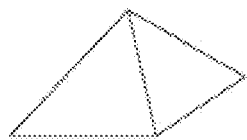
[Figure 15(c)]
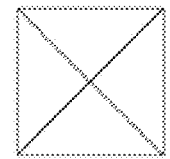
[Figure 15(d)]
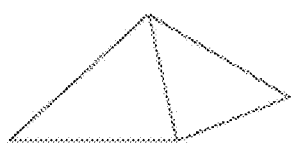
[Figure 15(e)]
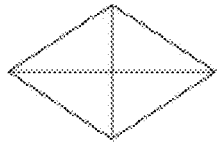
[Figure 15(f)]
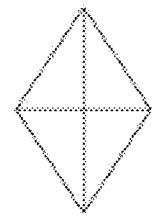
[Figure 15(g)]

LIGHT DEVICE OF VEHICLE

TECHNICAL FIELD

The present invention relates to a light device of a vehicle, and more particularly, to a light device of a vehicle installed at a rear of the vehicle using a light guide plate.

BACKGROUND ART

As a light device of a vehicle, various light devices such as a head lamp, a brake lamp, a turn signal lamp, and a tail lamp are provided. The existing light device has mostly used an incandescent lamp. Recently, the incandescent lamp tends to be replaced by a light emitting diode (LED).

FIG. 1 is a diagram illustrating the existing light device installed at a rear of a vehicle using a light emitting diode.

Referring to FIG. 1, the existing light device uses a plurality of light emitting diodes installed in a direct type to perform lighting. To this end, a printed circuit board is installed to correspond to a region to which light will be emitted and a plurality of light emitting diodes are mounted on the printed circuit board at a predetermined interval. Accordingly, when the light device emits light, the plurality of light emitting diodes are configured to emit light.

As described above, the light device in which the plurality of light emitting diodes are installed in the direct type may not perform surface emission, and therefore when an area to which light will be emitted is wide, the number of light emitting diodes to be mounted needs to be increased as much as the widened area. In addition, as described above, when the light emitting diode is installed in the direct type, a spot phenomenon may occur at a position where the light emitting diode is installed.

FIG. 2 is a diagram illustrating the existing another light device installed at a rear of a vehicle using a light emitting diode.

As described, to improve the direct type light device illustrated in FIG. 1, as illustrated in FIG. 2, light emitted from the light emitting diode is diffused to the light guide plate in a state in which the light emitting diode is installed at one side of the light guide plate to perform the surface emission. Japanese Patent Laid-Open Publication No. 2014-149995 (Vehicular Lamp, Published on Aug. 21, 2014, hereinafter, referred to as Cited Document) discloses the above-mentioned configurations.

However, if a light emitting diode module is installed at one side of the light guide plate as disclosed in the cited document, even if the vehicular lamp is configured to enable the light emitted from the light emitting diode to perform the surface emission in the light guide plate, as the light is getting farther away from the light emitting diode, light intensity is weak, such that the surface emission efficiency may be suddenly reduced at a position remote from a position at which the light emitting diode is installed.

That is, all of the light emitted from the light emitting diode installed at one side of the light guide plate does not reach the other side which is an opposite side of the light guide plate, such that the surface emission efficiency may be reduced at the other side of the light guide plate.

RELATED ART DOCUMENT

Patent Document

Japanese Patent Laid-Open Publication No. 2014-149995 (Aug. 21, 2014)

DISCLOSURE

Technical Problem

An object of the present invention is to provide a light device of a vehicle capable of uniformly performing surface emission over the whole of a light guide plate using a light emitting diode in the light device of a vehicle.

Technical Solution

According to an exemplary embodiment of the present invention, there is provided a light device of a vehicle, including: a light emitting diode module emitting light; and a light guide plate having a side on which the light emitted from the light emitting diode module is incident and emitting the light incident on the side to perform surface emission upwardly, in which the light guide plate has a plane shape including at least one concave portion and convex portion and the light emitting diode module is installed in the concave portion and/or the convex portion.

According to another exemplary embodiment of the present invention, there is provided a light device of a vehicle, including: a light emitting diode module emitting light; and a light guide plate having a side on which the light emitted from the light emitting diode module is incident and emitting the light incident on the side to perform surface emission upwardly, in which a plane shape of the light guide plate is formed in a ring shape and the light emitting diode module is installed along an inner side of the ring shape.

The light emitting diode module may include: at least one light emitting diode emitting light; and a printed circuit board (PCB) on which the at least one light emitting diode is mounted. The printed circuit board may be a flexible printed circuit board (FPCB).

The plane shape of the light guide plate may be formed in a horseshoe shape having a predetermined width.

The light emitting diode module may be provided in plural and one of the plurality of light emitting diode modules may be installed in a horseshoe-shaped concave portion and the rest thereof may be installed at a horseshoe-shaped end.

At least a portion of the light guide plate may be formed in a shape bent at a predetermined angle with respect to a plane-shaped plane.

The light device of a vehicle may further include: a cover part positioned over the light guide plate and transmitting light emitted from the light guide plate, and the upper portion of the light guide plate may protrude in a convex lens shape.

A side shape of the light guide plate may be formed in a squared shape having a predetermined thickness. A side shape of the light guide plate may have a predetermined thickness and may be provided with at least one curvature.

A side shape of the light guide plate may have a predetermined thickness and an upper surface of the light guide plate may be convexly or concavely formed.

The light emitting diode module may be provided in at least two, the light guide plate may be provided in at least two, and each of the at least two light guide plates may be provided with each of the light emitting diode modules.

The at least two light emitting diode modules may be installed on a side having a relatively longer length of sides of each of the at least two light guide plates.

The light guide plate may include at least one pattern part to emit the light incident on the side thereof upwardly.

The pattern part may include: a line pattern formed inside the light guide plate and having a length in one direction; and a dot pattern formed inside the light guide plate and formed in a pentahedral shape.

The dot pattern may have a plane shape formed in a squared shape, two sides facing each other formed in a triangular shape, and the other two sides facing each other formed in a trapezoidal shape.

The dot pattern may have the plane shape formed in the squared shape and four sides formed in the triangular shape.

The light guide plate may have at least one upper pattern formed on an upper surface thereof, the upper pattern may have a plurality of protrusions having a length in one direction formed on the upper surface of the light guide plate or the upper pattern may have a plurality of grooves having a length in one direction formed on the upper surface of the light guide plate.

According to still another exemplary embodiment of the present invention, there is provided a light device of a vehicle, including: a tail lamp installed at a rear of the vehicle and emitting red light; and a brake lamp installed at the rear of the vehicle and emitting the red light when a brake of the vehicle is driven, in which the tail lamp includes: a first light emitting diode module emitting light; and a first light guide plate having a side on which light emitted from the at least one first light emitting diode module is incident and emitting the light incident on the side to perform surface emission upwardly, a plane shape of the first light guide plate includes at least one concave portion, and the at least one first light emitting diode module is installed in the at least one concave portion.

At least a portion of the first light guide plate may be formed in a shape bent at a predetermined angle with respect to a plane-shaped plane.

The brake lamp may include: at least one second light emitting diode module emitting light. The brake lamp may further include a second light guide plate having a side on which light emitted from the at least one second light emitting diode module is incident and emitting the light incident on the side to perform surface emission upwardly.

The second light guide plate may be formed in a shape bent at a predetermined angle with respect to a plane-shaped plane.

Advantageous Effects

According to the exemplary embodiments of the present invention, when the shape of the light guide plate used in the light device installed at the rear of the vehicle to perform the surface emission is formed in the horseshoe shape or the ring shape, the light emitting diode module may be installed at the concave position of the horseshoe shape or the light emitting diode module may be installed along the ring-shaped inner side, thereby uniformly performing the surface emission over the whole of the light guide plate.

Further, as described above, it is possible to make the disposition of the light emitting diode module more efficient even if the shape of the light guide plate is changed as the light emitting diode module is installed on the light guide plate.

DESCRIPTION OF DRAWINGS

FIG. 1 is a diagram illustrating the existing light device of a vehicle.

FIG. 2 is a diagram illustrating the existing another light device of a vehicle.

FIG. 3 is a diagram illustrating a light device of a vehicle according to a first exemplary embodiment of the present invention.

FIG. 4 is a cross-sectional view illustrating the light device of a vehicle according to the first exemplary embodiment of the present invention.

FIG. 5 is a cross-sectional view illustrating a light device of a vehicle according to a second exemplary embodiment of the present invention.

FIG. 6 is a diagram illustrating a light device of a vehicle according to a third exemplary embodiment of the present invention.

FIG. 7 is a diagram illustrating configurations of a tail lamp and a brake lamp of a light device of a vehicle according to a fourth exemplary embodiment of the present invention.

FIG. 8 is a diagram illustrating configurations of a tail lamp and a brake lamp of a light device of a vehicle according to a fifth exemplary embodiment of the present invention.

FIG. 9 is a diagram illustrating configurations of a tail lamp and a brake lamp of a light device of a vehicle according to a sixth exemplary embodiment of the present invention.

FIG. 10 is a diagram illustrating a light device of a vehicle according to a seventh exemplary embodiment of the present invention.

FIG. 11 is a diagram illustrating a light device of a vehicle according to an eighth exemplary embodiment of the present invention.

FIG. 12 is a diagram illustrating a light device of a vehicle according to a ninth exemplary embodiment of the present invention.

FIGS. 13A and 13B are diagrams illustrating a light guide plate included in the light device of a vehicle according to the exemplary embodiment of the present invention.

FIG. 14 is a diagram illustrating a light guide plate included in the light device of a vehicle according to another exemplary embodiment of the present invention.

FIGS. 15A to 15G are diagrams illustrating examples of a dot pattern shape of a pattern part formed inside the light guide plate of the light device of a vehicle according to the exemplary embodiment of the present invention.

BEST MODE

Figure 16A:
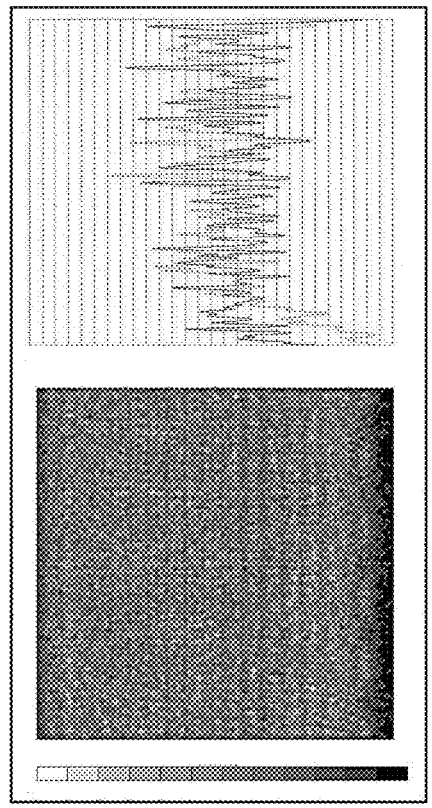
FIGS. 16A to 16D are diagrams illustrating simulation results of the light device of a vehicle according to the exemplary embodiment of the present invention.
Figure 16B:
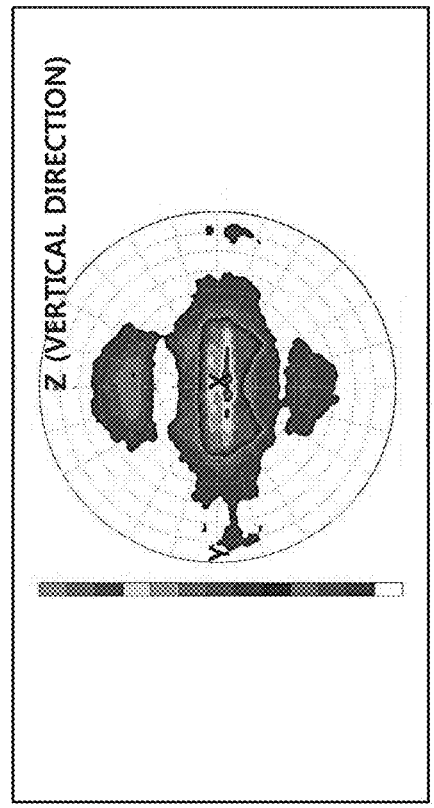
Figure 16C:
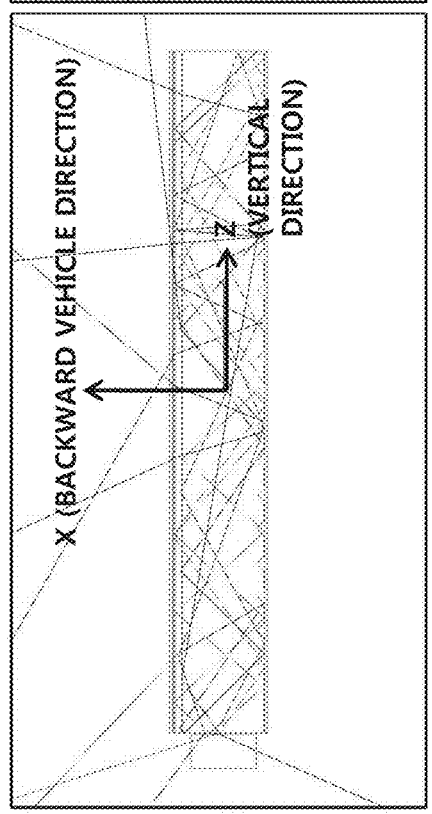
Figure 16D:
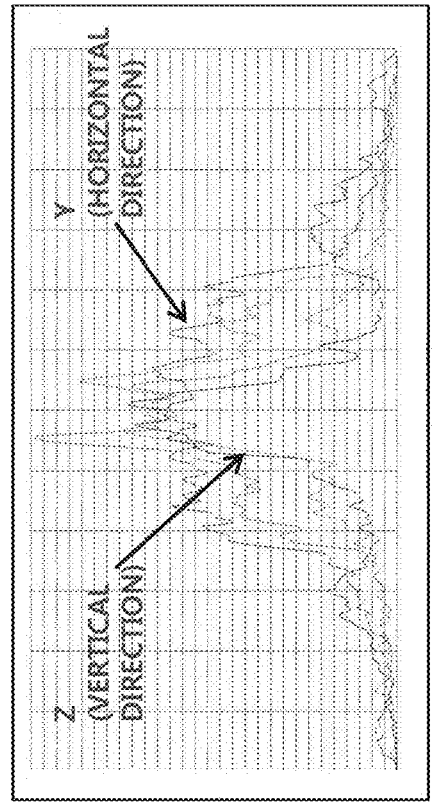

Exemplary embodiments of the present invention will be described in more detail with reference to the accompanying drawings.

FIG. 3 is a diagram illustrating a light device of a vehicle according to a first exemplary embodiment of the present invention and FIG. 4 is a cross-sectional view illustrating the light device of a vehicle according to the first exemplary embodiment of the present invention.

Referring to FIGS. 3 and 4, a light device 100 of a vehicle according to a first exemplary embodiment of the present invention includes a light emitting diode module 120, a light guide plate 110, and a cover part 130.

The light emitting diode module 120 includes a light emitting diode (LED) 122 emitting light and a printed circuit board 124 on which a light emitting diode 122 is mounted.

Although not separately illustrated, the light emitting diode 122 may include a housing, a lead frame coupled with the housing, a light emitting diode chip mounted on the lead frame, and a molding part covering the light emitting diode chip. Further, the molding part may have a phosphor included therein. The housing configuring a package body may be manufactured by injection-molding plastic resin such as PA and PPA and may be molded in a form in which the housing supports the lead frame by the injection molding process. Further, the housing may be provided with a cavity in which a light emitting diode chip is mounted and the cavity may define a light emitting region of the light emitting diode 122.

Further, the lead frame is provided to supply external electricity to the light emitting diode chip and the lead frame exposed to the outside of the housing is electrically connected to the printed circuit board 124. The molding part may be formed to cover the light emitting diode chip and may be formed to fill the cavity with molding resin including a phosphor. In this case, the molding part may fill the cavity of the housing and may have an upper surface formed in substantially a flat surface or a convex or concave curved surface.

Further, if necessary, the light emitting diode chip on which a conformal phosphor coating layer is formed may be mounted on the housing. That is, the conformal coating layer of the phosphor may be applied on the light emitting diode chip and the light emitting diode chip having the phosphor coating layer may be mounted on the housing. The light emitting diode chip having the conformal coating layer may be molded by transparent resin.

The printed circuit board 124 may have an upper surface provided with conductive land patterns for bonding the lead frame of the light emitting diode 122. Further, the upper surface of the printed circuit board 124 may be provided with a reflecting layer. As the printed circuit board 124, a metal-core PCB (MCPCB) based on metal having good thermal conductivity may be used. Further, according to the first exemplary embodiment of the present invention, as the printed circuit board 124, a flexible printed circuit board 124 may be used. The light emitting diode 122 is mounted on the flexible printed circuit board 124, such that when the light emitting diode module 120 is installed on the light guide plate 110, the light emitting diode module 120 may be freely installed on the mounting surface of the light guide plate 110 having various shapes.

The light guide plate 110 has the light emitted from the light emitting diode module 120 incident thereon and reflects the incident light to be emitted to a light emitting surface. As illustrated in FIG. 4, according to the first exemplary embodiment of the present invention, the light emitting diode module 120 may be installed on a side surface of the light guide plate 110 and may have a pattern part 112 provided at a lower portion thereof to emit the light incident on the side upwardly. The pattern part 112 will be described below. First, the shape of the light guide plate 110 will be described.

According to the first exemplary embodiment of the present invention, the light guide plate 110 is formed in a shape in which a plane shape thereof includes at least one concave portion. The light guide plate 110 is formed to correspond to a shape of a tail lamp installed at a rear of a vehicle. According to the first exemplary embodiment of the present invention, the plane shape of the light guide plate 110 includes a portion where at least one portion thereof is concavely formed. Further, as described above, a convex shape is formed at a position corresponding to the concave shape or another position. Therefore, an example in which the plane shape of the light guide plate 110 is formed in a shape such as a 'U'-letter horseshoe as illustrated in FIG. 3 will be described and the shape of the light guide plate 110 may be changed to various shapes if necessary.

The first exemplary embodiment of the present invention describes that the plane shape of the light guide plate 110 is formed in the horseshoe shape, but as described above, the light guide plate 110 may be formed in a shape in which the light guide plate 110 has at least one concave portion. That is, the shape including at least one concave portion may be the horseshoe shape, a shape in which the horseshoe shape is continued, and a ring shape. The ring shape is a rounded shape like a loop of which the center is formed with a space, like a donut or ring shape.

The light emitting diode module 120 may be installed inside or outside the light guide plate 110 formed in the ring shape to irradiate light in an outside direction of the light guide plate 110. That is, the light emitting diode module 120 may be installed on the side of the light guide plate 110 and may be installed in an inner side of the light guide plate 110 of which the plane shape is the ring shape to irradiate light to the light guide plate 110.

As illustrated in FIG. 4, the pattern part 112 is positioned inside the light guide plate 110 and may be disposed at a predetermined interval or may be disposed while having different disposition intervals depending on a surface emission pattern in the light guide plate 110. According to the first exemplary embodiment of the present invention, the pattern part 112 is disposed inside the light guide plate 110 to reflect the incident light upwardly of the light guide plate 110.

The cover part 130 may be disposed over the light guide plate 110 and may serve to refract the light emitted through the light guide plate 110. According to the first exemplary embodiment of the present invention, the shape of the cover part 130 is not particularly limited, but the cover part 130 may be formed with a pattern so that the surface-emitted light may be partially collected in the cover part 130.

Describing the relationship between each component of the light device of a vehicle according to the exemplary embodiment of the present invention including the above-mentioned configuration, the light emitting diode module 120 is formed at one side of the light guide plate 110. As illustrated in FIG. 3, the light emitting diode module 120 is installed in a concave portion among several sides of the light guide plate 110.

The tail lamp of the vehicle serves to inform a position, a width, or the like of the corresponding vehicle during the day or the night. Here, the tail lamp installed at the rear of the vehicle emits light weaker than that of the brake lamp so that the tail lamp is differentiated from the brake lamp. That is, the tail lamp emits light weaker than that of the brake lamp but continuously emits light, such that it is important to widely and uniformly emit light in an area to which light will be emitted.

To this end, according to the first exemplary embodiment of the present invention, the light emitting diode module 120 is installed in at least one concave portion of the light guide plate 110. Although the first exemplary embodiment of the present invention describes that the light emitting diode module 120 is installed in the concave portion, if necessary, the light emitting diode module 120 may be installed in the convex portion corresponding to the concave portion or may also be installed both in the concave portion and the convex portion. In this case, the concave portion means a position concavely formed inside the horseshoe-shaped light guide plate 110 and the convex portion means a position convexly formed outside the horseshoe-shaped light guide plate 110. In other words, the first exemplary embodiment of the present invention describes, for example, the horseshoe-shaped light guide plate 110, but even if the light guide plate 110 is formed in other shapes in addition to the horseshoe shape, the light emitting diode module 120 may be installed at a concavely formed position and/or a convexly formed position.

When the light emitted from the light emitting diode module 120 is incident on the light guide plate 110 and thus the surface emission is performed in the light guide plate 110, there is a need to perform the surface emission over the whole of the plane shape of the light guide plate 110. As such, since the uniform light needs to be emitted to the whole of the light guide plate 110 while predetermined light is incident, according to the first exemplary embodiment of the present invention, the light emitting diode module 120 is installed in the concave portion of the light guide plate 110 so that the light incident on the light guide plate 110 from the light emitting diode module 120 is disposed in a distance as short as possible.

Further, if necessary, the light emitted from the light emitting diode module 120 installed in the light guide plate 110 does not have the same luminous intensity but may have different luminous intensities depending on the installed position. That is, the light emitting diode 122 having high luminous intensity may be disposed in a relatively wider area according to the shape of the light guide plate 110 and the light emitting diode 122 having low luminous intensity may be disposed in a narrower area.

Meanwhile, as the plane shape of the light guide plate 110 according to the first exemplary embodiment of the present invention as described above, one light guide plate 110 provided with at least one concave portion is described, but the light guide plate 110 as illustrated in FIG. 3 using the plurality of light guide plates may be formed. That is, the plurality of light guide plates may be coupled with each other in the state in which the light emitting diode modules 120 are each installed on one sides of the plurality of light guide plates so that they may have the plane shape as illustrated in FIG. 3.

Further, describing the disposition in which the light emitting diode module 120 is installed in the light guide plate 110 with reference to FIG. 4, the printed circuit board 124 of the light emitting diode module 120 may be installed on a vehicle body 200 and the light emitting diode 122 may be installed to irradiate the light emitted from the light emitting diode 122 to the side of the light guide plate 110 in the state in which the light emitting diode 122 is vertically mounted to the printed circuit board 124. By this configuration, the light irradiated from the light emitting diode 122 may be incident on the light guide plate 110 and move within the light guide plate 110 by total internal reflection and may be reflected from the pattern part 112 to be surface-emitted upwardly of the light guide plate 110.

FIG. 5 is a cross-sectional view illustrating a light device of a vehicle according to a second exemplary embodiment of the present invention.

The light device 100 of a vehicle according to a second exemplary embodiment of the present invention includes the light emitting diode module 120, the light guide plate 110, and the cover part 130. The same description as that of the first exemplary embodiment of the present invention will be omitted in the second exemplary embodiment of the present invention.

According to the second exemplary embodiment of the present invention, the light emitting diode module 120 is installed on the side of the light guide plate 110 as illustrated in FIG. 3. In this case, the light emitting diode module 120 may include the light emitting diode 122 and the printed circuit board 124 and the light emitting diode 122 is mounted on the printed circuit board 124 in a horizontal direction. Further, the printed circuit board 124 on which the light emitting diode 122 is mounted is installed to the vehicle body 200 in a vertical direction so that the light emitted from the light emitting diode 122 may be irradiated to the side of the light guide plate 110.

Therefore, the light emitted from the light emitting diode module 120 is incident on the light guide plate 110 from the side of the light guide plate 110 to be surface-emitted in the light guide plate 110.

FIG. 6 is a diagram illustrating a light device of a vehicle according to a third exemplary embodiment of the present invention.

The light device 100 of a vehicle according to a third exemplary embodiment of the present invention includes the light emitting diode module 120, the light guide plate 110, and the cover part 130. The same description as that of the first exemplary embodiment of the present invention will be omitted in the third exemplary embodiment of the present invention.

According to the third exemplary embodiment of the present invention, the light emitting diode module 120 is installed on the side of the light guide plate 110. In this case, like the first exemplary embodiment of the present invention, one light emitting diode module 120 is not installed but three light emitting diode modules 120 are installed. Two light emitting diode modules 120 are each installed at both ends of the light guide plate 110 formed in a horseshoe shape and the rest one thereof is installed in the horseshoe-shaped concave portion.

As the two light emitting diode modules 120 are each installed at horseshoe-shaped ends, the surface emission may be performed in the horseshoe shape of the light guide plate 110. Further, the rest one of the light emitting diode modules 120 is installed in the horseshoe-shaped concave portion to irradiate light to a position where the light irradiated from the light emitting diode modules 120 installed at both ends may not be reached, such that light may be uniformly emitted over the whole of the light guide plate 110.

As such, as the light emitting diode module 120 is partially installed on the side of the light guide plate 110, the surface emission may be uniformly performed over the whole of the light guide plate 110.

FIG. 7 is a diagram illustrating configurations of a tail lamp and a brake lamp of a light device of a vehicle according to a fourth exemplary embodiment of the present invention.

The light device of a vehicle according to a fourth exemplary embodiment of the present invention may include a tail lamp and a brake lamp, in which the tail lamp may have the same structure as that of the first exemplary embodiment of the present invention. In this case, unlike the configuration of the tail lamp, the brake lamp is installed in the direct type structure in which the plurality of light emitting diode modules 320 are installed under the cover part 330. Therefore, according to the fourth exemplary embodiment of the present invention, the light emitting diode module 120 is installed on the side of the light guide plate 110 such that the tail lamp may perform surface emission in the light guide plate 110 and the brake lamp directly emits light emitted from the plurality of light emitting diode modules 320 installed under the cover part 330 without the light guide plate. In this case, as illustrated in FIG. 3 or 6, the tail lamp is provided with the concave portion and the brake lamp emits light within the concave portion, such that light emitted from the tail lamp and the brake lamp may not interfere with each other.

FIG. 8 is a diagram illustrating configurations of a tail lamp and a brake lamp of a light device of a vehicle according to a fifth exemplary embodiment of the present invention.

The light device of a vehicle according to the fifth exemplary embodiment of the present invention may include the tail lamp and the brake lamp and the description of the same components as those of the first and fourth exemplary embodiments of the present invention will be omitted in the fifth exemplary embodiment of the present invention.

According to the fifth exemplary embodiment of the present invention, as illustrated in FIG. 3 or 6, the light guide plate 110 of the tail lamp has at least one concave portion and the inside of the plane shape of the light guide plate 110 is formed in a bent state to have a predetermined angle with respect to the plane-shaped plane. Therefore, the light emitted from the light emitting diode module 120 is incident on the inside of the light guide plate 110 from a bent end of the light guide plate 110 to be surface-emitted in the light guide plate 110.

As described above, as the light guide plate 110 is formed in a bent shape, the light emitting diode module 120 for irradiating light to the tail lamp may be installed on the same vehicle body 200 as the light emitting diode module 120 used for the brake lamp. In this case, like the fourth exemplary embodiment of the present invention, according to the fifth exemplary embodiment of the present invention, the brake lamp may be installed in the direct type.

FIG. 9 is a diagram illustrating configurations of a tail lamp and a brake lamp of a light device of a vehicle according to a sixth exemplary embodiment of the present invention.

The light device of a vehicle according to the sixth exemplary embodiment of the present invention may include the tail lamp and the brake lamp and the description of the same components as those of the first, fourth, and fifth exemplary embodiments of the present invention will be omitted in the sixth exemplary embodiment of the present invention.

The tail lamp according to the sixth exemplary embodiment of the present invention is installed to have the same structure as that of the fifth exemplary embodiment of the present invention and the brake lamp includes a light emitting diode module 320 and a light guide plate 310. The light guide plate 310 of the brake lamp has a predetermined shape and both ends of the light guide plate 310 are formed in a bent shape. Therefore, bent both ends of the light guide plate 310 are provided with the light emitting diode modules 320 such that light emitted from the light emitting diode module 320 may be incident on the light guide plate 310 to be surface-emitted in the light guide plate 310. Therefore, according to the sixth exemplary embodiment of the present invention, like the tail lamp, the brake lamp may emit light in the light guide plate 310 by the surface emission.

FIG. 10 is a diagram illustrating a light device of a vehicle according to a seventh exemplary embodiment of the present invention.

The light device 100 of a vehicle according to a seventh exemplary embodiment of the present invention includes the light emitting diode module, the light guide plate 110, and the cover part. The same description as those of the foregoing exemplary embodiments of the present invention will be omitted in the seventh exemplary embodiment of the present invention.

According to the seventh exemplary embodiment of the present invention, the light emitting diode module 120 is installed on one side of the light guide plate 110. Further, as illustrated, the light guide plate 110 may have at least one curvature. Like the foregoing exemplary embodiments of the present invention, as illustrated in FIG. 3, the plane shape of the light guide plate 110 is formed in a horseshoe shape and the side thereof may be formed to have at least one curvature.

The reason of making the light guide plate 110 have the curvature is that the shape of the light guide plate 110 may be designed to meet a design of a vehicle.

Further, the inside of the light guide plate 110 may be provided with the pattern part 112 having the light emitted from the light emitting diode module 120 reflected therefrom to emit light upwardly of the light guide plate 110. As the light guide plate 110 is formed to have the curvature, a position and a size of the pattern part 112 may be changed. For example, as illustrated in FIG. 10, if the light guide plate 110 is formed to be warped downwardly as it is getting farther away from the light emitting diode module 120, the pattern parts 112 may be formed so that a spaced distance between pattern parts may be formed to be narrow or a size thereof may be formed to be large as the pattern parts 112 are getting farther away from the light emitting diode module.

As described above, as the shape of the light guide plate 110 is changed, the position such as the interval between the pattern parts 112 formed therein may be changed or the size of the pattern part 112 may be adjusted, such that uniformity of light surface-emitted upwardly of the light guide plate 110 may be adjusted.

FIG. 11 is a diagram illustrating a light device of a vehicle according to an eighth exemplary embodiment of the present invention.

The light device 100 of a vehicle according to an eighth exemplary embodiment of the present invention includes the light emitting diode module 120, the light guide plate 110, and the cover part. The same description as those of the foregoing exemplary embodiments of the present invention will be omitted in the eighth exemplary embodiment of the present invention.

In the light guide plate 110 according to the eighth exemplary embodiment of the present invention, as illustrated, a surface from which light is emitted may be convexly formed. Therefore, the light emitted from the light guide plate 110 may be collected in a specific direction. Further, the light emitting surface of the light guide plate 110 may also be formed concavely.

As such, as the light emitting surface of the light guide plate 110 is convexly or concavely formed, the interval or the size of the pattern part 112 formed in the light guide plate 110 may be adjusted, such that the uniformity of light emitted to the light emitting surface may be adjusted.

FIG. 12 is a diagram illustrating a light device of a vehicle according to a ninth exemplary embodiment of the present invention.

The light device 100 of a vehicle according to the ninth exemplary embodiment of the present invention includes first and second light emitting diode modules 120*a* and 120*b* and first and second light guide plates 110*a* and 110*b* and the same description as those of the foregoing exemplary embodiments of the present invention will be omitted in the ninth exemplary embodiment of the present invention.

As illustrated in FIG. 12, according to the ninth exemplary embodiment of the present invention, the light guide plates 110*a* and 110*b* may each be installed in the light device 100 of a vehicle in the state in which they are separated into two. As such, as the first and second light guide plates 110a and 110b are each installed, the light emitting diode modules 120a and 120b are provided in two and thus may each be installed in the first and second light guide plates 110a and 110b. The first and second light emitting diode modules 120a and 120b may be installed on one sides of the first and second light guide plates 110a and 110b and may be installed on a side having a relatively longer length among the sides of the first and second light guide plates 110a and 110b. Therefore, the light emitted from the first and second light emitting diode modules 120a and 120b is incident on the first and second light guide plates 110a and 110b, such that light may be irradiated at a relatively shorter distance.

FIG. 12 illustrates that the first light emitting diode module 120a is installed under the first light guide plate 110a and the second light emitting diode module 120b may be installed under the second light guide plate 110b in the state in which the first light guide plate 110a is disposed at the upper portion and the second light guide plate 110b is disposed at the lower portion. Each of the light emitting diode modules 120a and 120b may be installed at one of the upper portions or the lower portions of each of the light guide plates 110a and 110b while being installed at the side having the relatively longer length among the sides of the light guide plates 110a and 110b.

FIGS. 13A and 13B are diagrams illustrating a light guide plate included in the light device of a vehicle according to the exemplary embodiment of the present invention and FIG. 14 is a diagram illustrating a light guide plate included in the light device of a vehicle according to another exemplary embodiment of the present invention.

Referring to FIGS. 13A and 13B, the upper surface of the light guide plate 110 according to the exemplary embodiment of the present invention may be provided with an upper pattern R formed in one length direction. As illustrated, the upper pattern R may be formed on the upper surface of the light guide plate 110 as a plurality of grooves or protrusions and may control the shape of light emitted through the light guide plate 110. Further, the upper pattern R prevents the light emitted through the light guide plate 110 from being totally reflected inside the light guide plate 110.

As illustrated in FIG. 13B, each side of the upper pattern R may be formed in a triangular shape or as illustrated in FIG. 14, may be formed in a convex shape. A height and a gradient of the upper pattern R may be controlled according to the shape of light emitted through the light guide plate 110. In this case, when side cross sections of the upper pattern R and the pattern part 112 are formed in a triangular shape, an upper vertex having a triangular shape may be formed in a rounded shape.

Further, as illustrated in FIG. 13A, the pattern part 112 formed inside the light guide plate 110 may include a line patterns 112a formed in one length direction and a dot pattern 112b formed in a dot shape.

The line pattern 112a may be formed in the same direction as or a vertical direction to the upper pattern R and may be formed in a vertical direction to a direction of the light emitted from the light emitting diode module 120. The dot pattern 112b may be disposed between the line patterns 112a. As illustrated in FIG. 13A, the line patterns 112a extend in a length direction and then the dot pattern 112b may be formed and the line patterns 112a and the dot pattern 112b may be disposed to be spaced apart from each other. Alternatively, only the line patterns 112a may be formed and only the dot pattern 112b may also be formed.

As such, as the dot pattern 112b is formed, the light emitted from the light emitting diode module 120 may be controlled to make marks, etc., appear in the shape of the emitted light while being emitted through the light guide plate 110.

FIGS. 15A to 15G are diagrams illustrating examples of the dot pattern shape of the pattern part formed inside the light guide plate of the light device of a vehicle according to the exemplary embodiment of the present invention.

As illustrated in FIGS. 15A and 15B, the dot pattern 112b is formed in a pentahedral shape in which a plane shape is formed in a squared shape, two side shapes facing each other are formed in a triangular shape, and the other two side shapes facing each other are formed in a trapezoidal shape. In this case, the light emitted from the light emitting diode module 120 is incident on the side having the trapezoidal shape to reflect light upwardly of the light guide plate 110. Therefore, the light emitted upwardly of the light guide plate 110 may appear as light emitted from one point by the dot pattern 112b.

Further, as illustrated in FIGS. 15C and 15D, the dot pattern 112b may be formed in a pyramid shape in which the plane shape thereof is squared shape and the side thereof is a triangular shape. As illustrated in FIG. 15E to 15G, the dot pattern 112b may be formed in the modified pyramid shape in which the side in which the plane shape is formed in a diamond shape is formed in the triangular shape. As such, the dot pattern 112b is formed in the pyramid shape, such that the light emitted through the dot pattern 112b having the pyramid shape may be more uniformly emitted. As such, the shape of the dot pattern 112b may be variously formed.

FIGS. 16A to 16D are diagrams illustrating simulation results of the light device of a vehicle according to the exemplary embodiment of the present invention.

FIG. 16 illustrates simulation results for the formation of the upper pattern R in the light guide plate 110 and the formation of the plurality of line patterns 112a therein in the light device 100 of a vehicle according to the exemplary embodiment of the present invention. In this case, the simulation is performed in the state in which a thickness of the light guide plate 110 is 2.5 T (mm), the upper pattern R formed on the light guide plate 110 is formed in the triangular shape, and an upper vertex having the triangular shape is formed in the rounded shape. In this case, a radius of the vertex having the rounded shape is 0.1 mm, a height of the triangular shape is 0.208 mm, and an interval of the upper pattern R is 0.5 mm. Further, the cross section of the line pattern 112a is formed inside the light guide plate 110 in the triangular shape and an angle of the upper vertex having the triangular shape is set to be 98°, such that the line pattern 112a may be formed to be symmetrical to each other. In this case, the height of the triangular shape is set to be 0.2 mm and the interval of the line pattern 112a is set to be 1.0 mm.

As described above, if the light guide plate 110 is formed, as illustrated in FIG. 16A, the light incident on the light guide plate 110 may be reflected to be emitted upwardly of the light guide plate 110. Further, it may be confirmed from FIG. 16B that light is uniformly emitted over the whole surface of the light guide plate 110 and it may be confirmed from FIG. 16C that light having a desired directional angle in a vertical direction and a horizontal direction of the light guide plate 110 is emitted. Further, it may be confirmed from FIG. 16D that the emitted light is concentrated on the center.

Although the detailed description of the present invention is made with reference to the accompanying drawings, the foregoing exemplary embodiments are just described with reference to the preferred example of the present invention and therefore the present invention is not understood as being limited only to the exemplary embodiment and the scope of the present invention is to be understood as the claims and the equivalent concept to be described below.

[List of Reference Numerals]

| | |
|---|---|
| 100: light device | |
| 110: the light guide plate | 112: pattern part |
| 112a: line patterns | 112b: dot pattern |
| 120: light emitting diode module | 122: light emitting diode |
| 124: printed circuit board | 130: cover part |
| 200: vehicle body | R: upper pattern |

The invention claimed is:

1. A light device of a vehicle, comprising: a light emitting diode module emitting light and located on a body of the vehicle, the body of the vehicle having two opposing sides for accommodating the light emitting diode module; and a light guide plate having a side on which the light emitted from the light emitting diode module is incident and emitting the light incident on the side to perform surface emission upwardly, wherein the light guide plate has a plane shape including at least one concave portion and convex portion, and the light emitting diode module is installed in the concave portion and/or the convex portion.

2. The light device of a vehicle of claim 1, wherein a side shape of the light guide plate has a predetermined thickness and an upper surface of the light guide plate is convexly or concavely formed.

3. The light device of a vehicle of claim 1, wherein the light emitting diode module includes: at least one light emitting diode emitting light; and a printed circuit board (PCB) on which the at least one light emitting diode is mounted.

4. The light device of a vehicle of claim 3, wherein the printed circuit board is a flexible printed circuit board (FPCB).

5. The light device of a vehicle of claim 1, wherein the light guide plate includes at least one pattern part to emit the light incident on the side thereof upwardly.

6. The light device of a vehicle claim 5, wherein the pattern part includes: a line pattern formed inside the light guide plate and having a length in one direction; and a dot pattern formed inside the light guide plate and formed in a pentahedral shape.

7. The light device of a vehicle of claim 6, wherein the dot pattern has a plane shape formed in a squared shape, two sides facing each other formed in a triangular shape, and the other two sides facing each other formed in a trapezoidal shape.

8. The light device of a vehicle of claim 6, wherein the dot pattern has a plane shape formed in a squared shape and four sides formed in a triangular shape.

9. The light device of a vehicle of claim 1, wherein an upper portion of the light guide plate protrudes in a convex lens shape.

10. The light device of a vehicle of claim 1, wherein a side shape of the light guide plate is formed in a squared shape having a predetermined thickness.

11. The light device of a vehicle of claim 1, wherein the light guide plate has at least one upper pattern formed on an upper surface thereof.

12. The light device of a vehicle of claim 11, wherein the upper pattern has a plurality of protrusions having a length in one direction formed on the upper surface of the light guide plate.

13. The light device of a vehicle of claim 11, wherein the upper pattern has a plurality of grooves having a length in one direction formed on the upper surface of the light guide plate.

14. The light device of a vehicle of claim 1 further comprising: a cover part positioned over the light guide plate and transmitting light emitted from the light guide plate.

15. A light device of a vehicle, comprising: a light emitting diode module emitting light located on a body of the vehicle; and a light guide plate having a side on which the light emitted from the light emitting diode module is incident and emitting the light incident on the side to perform surface emission upwardly, wherein the light guide plate has a plane shape including at least one concave portion and convex portion, the light emitting diode module is installed in the concave portion and/or the convex portion, and the plane shape of the light guide plate is formed in a horseshoe shape having a predetermined width.

16. The light device of a vehicle of claim 15, wherein the light emitting diode module is provided in plural, and one of the plurality of light emitting diode modules is installed in a horseshoe-shaped concave portion and the rest thereof are installed at a horseshoe-shaped end.

17. A light device of a vehicle, comprising: a light emitting diode module emitting light located on a body of the vehicle; and a light guide plate having a side on which the light emitted from the light emitting diode module is incident and emitting the light incident on the side to perform surface emission upwardly, wherein the light guide plate has a plane shape including at least one concave portion and convex portion, the light emitting diode module is installed in the concave portion and/or the convex portion, and at least a portion of the light guide plate is formed in a shape bent at a predetermined angle with respect to a plane-shaped plane.

18. A light device of a vehicle, comprising: a light emitting diode module emitting light located on a body of the vehicle; and a light guide plate having a side on which the light emitted from the light emitting diode module is incident and emitting the light incident on the side to perform surface emission upwardly, wherein the light guide plate has a plane shape including at least one concave portion and convex portion, the light emitting diode module is installed in the concave portion and/or the convex portion, and a side shape of the light guide plate has a predetermined thickness and is provided with at least one curvature.

19. A light device of a vehicle, comprising: a light emitting diode module emitting light located on a body of the vehicle; and a light guide plate having a side on which the light emitted from the light emitting diode module is incident and emitting the light incident on the side to perform surface emission upwardly, wherein the light guide plate has a plane shape including at least one concave portion and convex portion, the light emitting diode module is installed in the concave portion and/or the convex portion, and the light emitting diode module is provided in at least two, the light guide plate is provided in at least two, and each of the at least two light guide plates is provided with each of the light emitting diode modules.

20. The light device of a vehicle of claim 19, wherein the at least two light emitting diode modules are installed on a side having a relatively longer length of sides of each of the at least two light guide plates.

21. A light device of a vehicle, comprising:
a light emitting diode module emitting light and located on a body of the vehicle, the body of the vehicle having two opposing sides for accommodating the light emitting diode module; and a light guide plate having a side on which the light emitted from the light emitting diode module is incident and emitting the light incident on the side to perform surface emission upwardly, wherein a plane shape of the light guide plate is formed in a ring shape, and the light emitting diode module is installed along an inner side of the ring shape.

22. A light device of a vehicle, comprising: a tail lamp installed at a rear of the vehicle and emitting red light; and a brake lamp installed at the rear of the vehicle and emitting the red light when a brake of the vehicle is driven, wherein the tail lamp includes: a first light emitting diode module emitting light; and a first light guide plate having a side on which light emitted from the at least one first light emitting diode module is incident and emitting the light incident on the side to perform surface emission upwardly, a plane shape of the first light guide plate includes at least one concave portion, and the at least one first light emitting diode module is installed in the at least one concave portion.

23. The light device of a vehicle of claim 22, wherein at least a portion of the first light guide plate is formed in a shape bent at a predetermined angle with respect to a plane-shaped plane.

24. The light device of a vehicle of claim 22, wherein the brake lamp includes at least one second light emitting diode module emitting light.

25. The light device of a vehicle of claim 24, wherein the brake lamp further includes a second light guide plate having a side on which light emitted from the at least one second light emitting diode module is incident and emitting the light incident on the side to perform surface emission upwardly.

26. The light device of a vehicle of claim 25 wherein the second light guide plate is formed in a shape bent at a predetermined angle with respect to a plane-shaped plane.

* * * * *